United States Patent Office 3,280,479
Patented Oct. 25, 1966

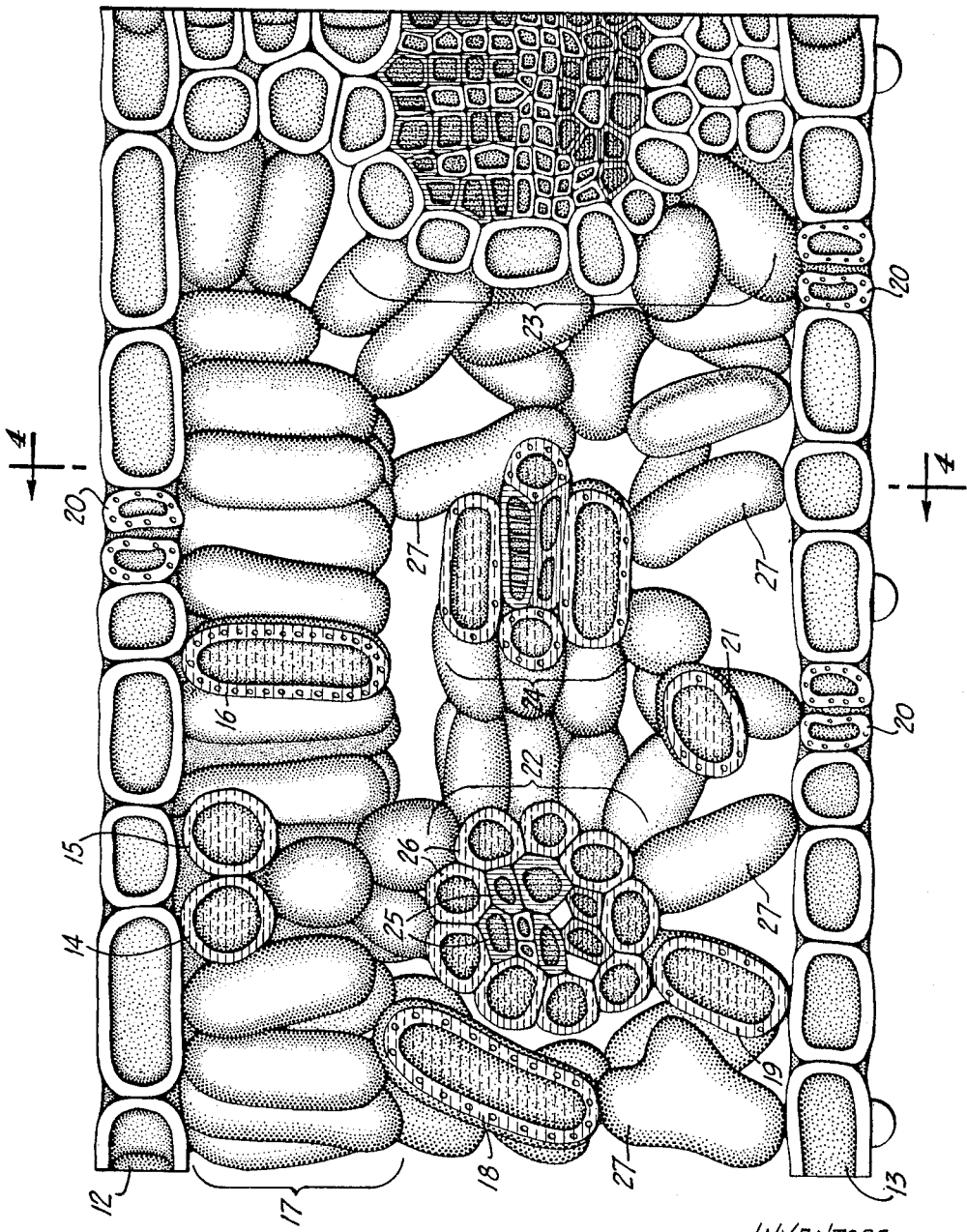

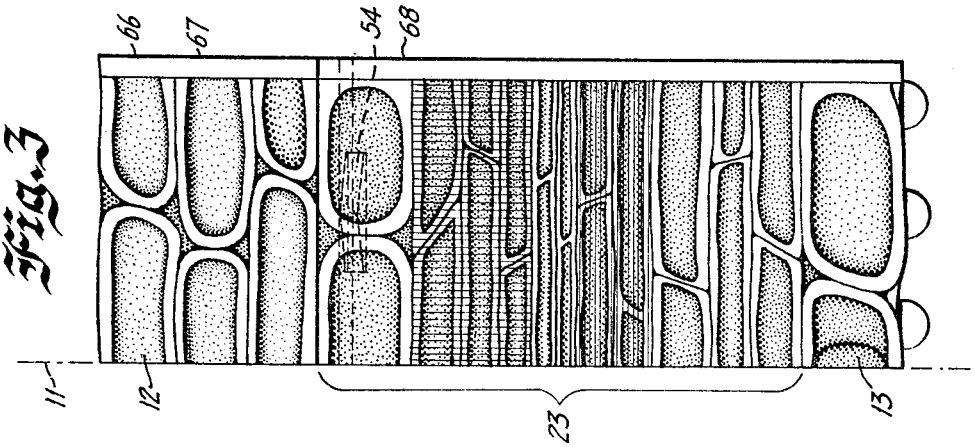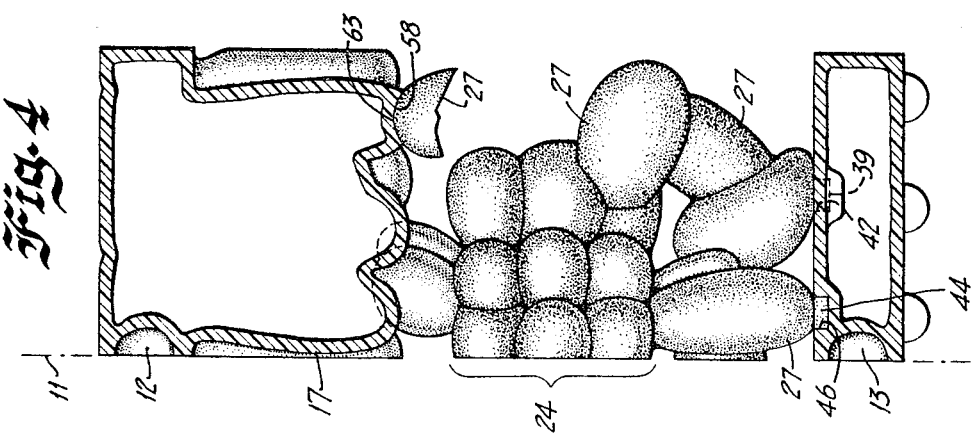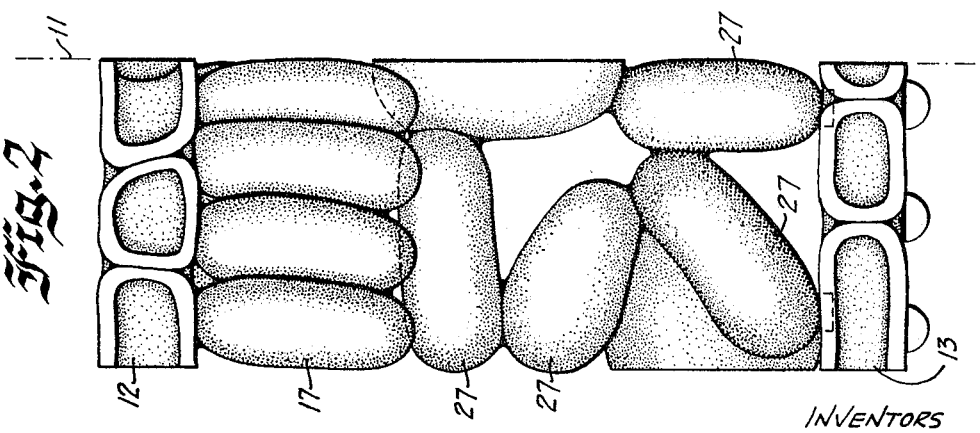

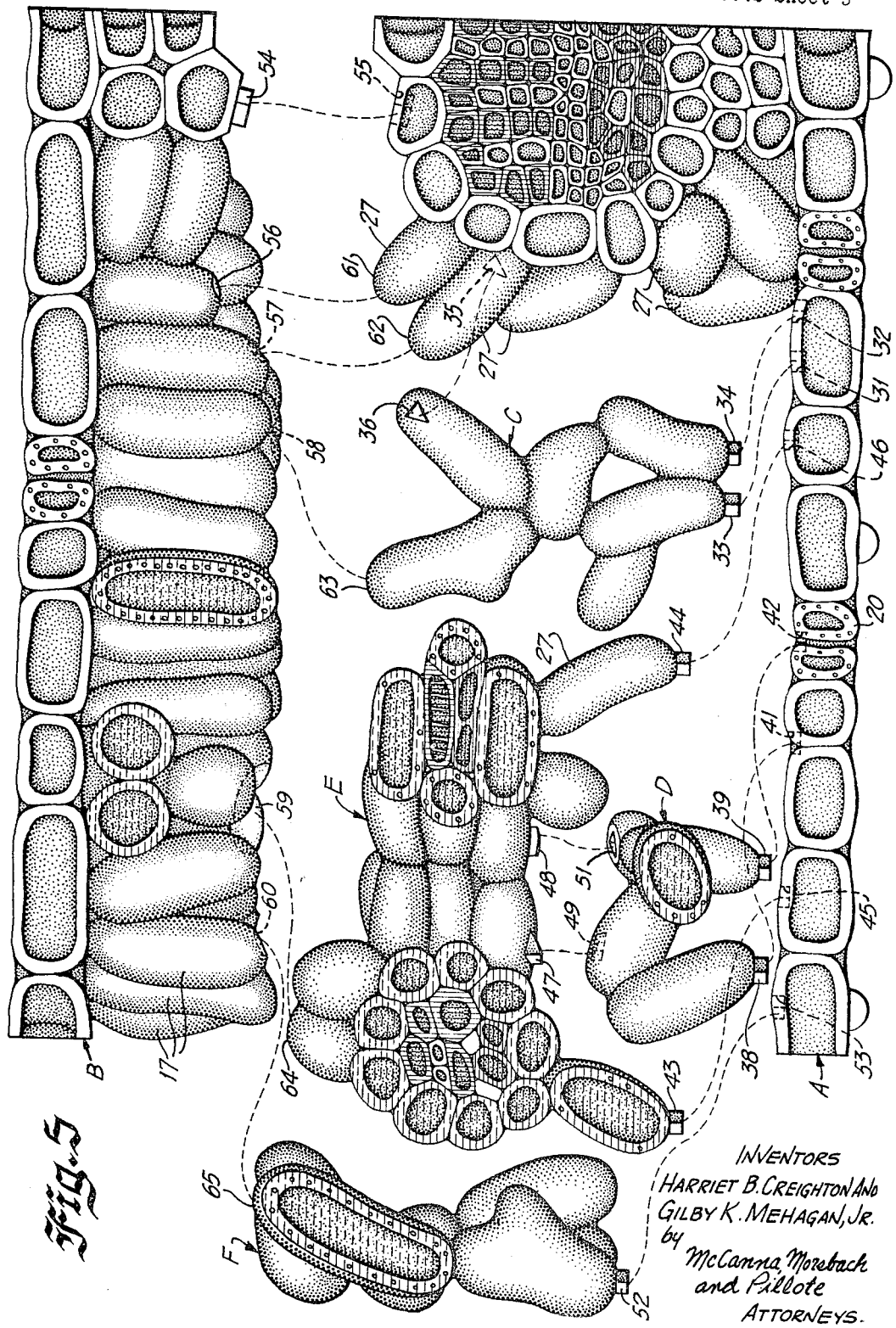

3,280,479
MODEL FOR TEACHING BIOLOGICAL SCIENCES
Harriet B. Creighton, Wellesley, Mass., and Gilby K. Mehagan, Jr., Downers Grove, Ill., assignors to Nystrom Biological Model Company, Chicago, Ill., a corporation of Illinois
Continuation of application Ser. No. 319,413, Oct. 28, 1963. This application Feb. 28, 1966, Ser. No. 540,122
6 Claims. (Cl. 35—20)

This application is a continuation of our application for patent Serial No. 319,413, filed October 28, 1963, now abandoned.

The invention relates in general to the biological sciences and has more particular reference to teaching certain phases of such sciences with the aid of visual illustrative models and also to the manufacture of such models.

More particularly, our invention in its present application relates to the teaching of botany, especially the structure and functioning of the microscopical cells of which foliage leaves are made.

For many years, manufacturers of biological models have made enlarged cross sectional models of foliage leaves for use in the visual illustration of the cellular structure thereof as an aid in teaching. It is customary to use such models in conjunction with the study of sections of leaves and with text books which carry descriptions of the cell structures and of their functioning. However, such practices have not been altogether satisfactory and they have presented problems in the field of teaching. For example, we have observed difficulties in conveying to students a ready comprehension of this subject, with the result that the student does not readily understand and assimilate the teachings, particularly with respect to the process of photosynthesis, the making of food for plants.

The primary object of our invention is, therefore, to improve the teaching in the biological sciences of leaf structure and photosynthesis of the character mentioned. To this end we have provided an improved model having novel features whereby to more readily coordinate an understanding of the teaching of the cellular structure in a foliage leaf or the like and the functioning thereof in the process of food making for the plant. More particularly, we have provided a model of improved and novel construction characterized by physically and visually portraying the intercellular spaces so that there may be quicker and better understanding of the process of photosynthesis fundamental to plant and animal life.

Another object of our invention is the provision of a model of the character described having novel features of construction, whereby the model may be manufactured economically and to a form portraying the structures fundamental to understanding the principles of photosynthesis in plant physiology.

In furtherance of the foregoing our invention involves the conception of a model for teaching, such as a cross-section through a foliage leaf magnified many times and characterized by first a novel showing of intercellular areas or spaces between the cells or groupings of cells. This portrays the air cavities and passages having depth continuity which in prior model techniques are absent or represented merely by face surfaces. With our invention the model structure greatly assists in classroom presentation of the anatomy of a leaf or the like, which in turn facilitates and enhances the teaching of photosynthesis. Secondly, our invention contemplates a novel method of manufacture, whereby the model may be manufactured at a comparatively low cost considering the novelty and merits of the structure. These objects and the attendant advantages of our invention will be appreciated by those skilled in this art as the invention becomes better understood by reference to the following description when considered in connection with the accompanying drawings, in which:

FIGURE 1 is a face view of a teaching model embodying our invention, portraying a cross-section greatly enlarged through a generailzed foliage leaf, this model in actual practice being an enlargement of a leaf structure about 600 times;

FIG. 2 is an end view of the model, looking at the left hand end of FIG. 1;

FIG. 3 is an end view of the model, looking at the right hand end of FIG. 1;

FIG. 4 is a sectional view through the model, taken substantially on the section line 4—4 of FIG. 1; and FIG. 5 is a so-called exploded view of the model, showing the several components of the model in separated relation, one with respect to another, before the components are assembled into a single composite unit, as will be described more particularly hereinafter.

In illustrating our invention we have taken an example applied specifically to a foliage leaf. The model shown in the drawings portrays characteristic features of a section through a leaf but with the cellular structure generalized in a manner consistent with the teaching of photosynthesis and plant anatomy, as contemplated by this invention. In actual practice the microscopic structure is many times magnified, preferably in a unitary model with the individual cellular features portrayed by molding to the intended shape. In actual practice we make this model to a height of approximately 9 inches, length or width of 13 inches and a depth of 3½ inches, although the full size drawings filed with this application are on a proportion somewhat less than these dimensions. It will be appreciated, of course, that these dimensions are not critical or a limitation but they do illustrate the novelty and advantages of our invention in its practical application. Also, the term "section" is used to designate not only a single plane or face surface of the section but the entire body or composite of the section extending a substantial depth in a direction transverse to and away from said face to a distance sufficient to embody a multitude of chloroplast-containing cells in their entirety and in fact a substantial grouping of such cells in their normal relation. The top and bottom of the model portrays the epidermis. The cellular structure intermediate between the upper and lower epidermises, generall referred to as the mesophyll, in the lower part is spongy in nature but in fact the individual chloroplast-containing cells or cell groups are interspersed with air spaces. This characteristic, that is, the condition of the cells submerged as it were in air spaces, is physically portrayed in the model. Also, for the purpose of better illustrating the invention, the front of the model, sometimes referred to herein as the "face," is actually in section so as to present to the eye not only a number of actual sections through the cellular structure but also the intercellular air spaces or cavities extending entirely through the model as defined by the external surfaces of the cells and cellular formations. In the model, this front or face surface is indicated by the dotted line 11 in FIGS. 3 and 4. In this instance this surface 11 is an actual section through the epidermis 12 and 13 at the top and bottom, respectively, of the model. This section surface is also through palisade cells 14, 15, and 16 which are included in the layer of palisade cells designated generally by 17. Said face section is also through intermediate cells 18, 19 and 21, veinlet section designated generally by 22, a longitudinal vein generally embraced within the bracket lines 23 in FIGS. 1 and 3, and a small veinlet section designated by 24. Some of these sections are in colors to illustrate different function characteristics; for example, the small red cells 25 are shown in direct contact with cells 26 which contain chlorophyll. This enables the student to see that water brought in by the xylem (shown in red) is carried immediately into the mesophyll cells. Also the carbohydrates produced in the mesophyll cells are carried quickly into the phloem (shown in blue). The epidermis, colored gray, is generally a single layer of cells which completely surrounds the leaf. These cells are without pigment and, therefore, colorless. The epidermis 12 and 13 carry many small guard cells 20 and stomata or openings through which air is admitted from the atmosphere to the air space within the leaf, in accordance with functioning well understood in botany. It will now be observed that the spongy mesophyll chloroplast-containing cells not shown in section but by exterior view only and designated generally by 27 are in what might be termed promiscuous arrangement. Some of such cells are contiguous one to another, some are in small groupings, and some appear to be quite individual. However, the peripheral or exterior surfaces of these cells (except where connected or adhered to contiguous cells) are directly exposed to the air spaces which are present and have continuity throughout the mesophyll area. These mesophyll cells contain the chloroplasts which give the leaf its characteristic green color visible through the epidermis. The cells in the mesophyll area must be in contact with the air spaces or receive air therefrom in order to carry on the function of synthesising food for the plant, known as photosynthesis. It will be apparent, therefore, that this model accurately portrays the relatively large amount of intercellular air space within the layer of spongy mesophyll. The model graphically illustrates the structural condition which allows free exchange of gases between the external atmosphere and the inside of the leaf which is essential to the activity of making food for plant life through the leaves. It is not believed necessary for an understanding of this invention to enter into a technical description of the functioning of photosynthesis, other than is disclosed herein.

Referring now to the manufacture of the model, our invention contemplates making individual units or components each portraying a given portion of the cellular structure and each having peripheral shape characteristics showing assembly of cells or cell structure, and interlocking these components in predetermined relation one with respect to the other to produce a complete, integrated and unitary model. Because of the intricacies of the cellular structure we form the individual components by plastic molding, preferably with vinyl plastisol, using two-piece metal molds, and heating the molds. The specific method or process steps in making the individual components is not a part of the present invention, nor is the material used a part of the invention. In its broader phase, our invention is utilized by any suitable method of manufacturing a teaching model having the novel features hereinabove described. In its manufacturing phase we have attained distinct advantages in the construction and assembly features herein described. It will be observed that in some of the components we obtain both external shape of cells and also sectional features. Also, by making the lower and upper epidermis in separate components we utilize these as base or body structures between which the cell components are located and interlocked. In the present embodiment we have provided components A to F, respectively, shown in separated relation in FIG. 5. The base component A comprises the entire lower epidermis (previously designated 13), the upstanding vein portion (designated 23), and a plurality of mesophyll cells 27 integral with said vein portion and to the rear of the front face 11. Component B comprises the upper epidermis and the layer of palisade cells 17, above mentioned. Component E is a combination of small veinlet 22 above described, chloroplast-containing cells 27, and grouping of these cells and vein structure in section designated 24. Each of components C, D, E, and F comprises or includes a plurality of chloroplast-containing cells 27 arranged in a manner to serve as connectors for interlocking the components and also for better illustrating the intercellular air spaces. The interlocking may be effected by suitable means. We prefer to provide registering sockets and interfitting lugs such, for example, as the sockets 31 and 32 which receive the lugs 33 and 34 on the component C, and the socket 35 in the rear of one of the cells 27 which receives the lug 36 on the front face of one of the cells of component C. Likewise, lugs 38 and 39 are adapted to fit in sockets 41 and 42, respectively, in the base component. After components C and D have been mounted, component E is positioned on top of component D with lugs 43–44 fitting in sockets 45–46 on component D and lugs 47–48 fitting in sockets 49–51 on component D. Component F is then mounted with its lug 52 fitting in socket 53. Finally, the top component is mounted on the previously assembled components, lug 54 fitting in socket 55, and cavities 56, 57, 58, 59 and 60 fitting over and receiving the rounded ends 61, 62, 63, 64 and 65, respectively, of the underlying components. All the interfitting parts described are further interlocked by a suitable binder, adhesive or cement, at the time of assembling, with the result that an integrated, unitary model is produced. It will be observed that each component is a unit individually molded to provide a maximum of exterior surfaces of the cells in the mesophyll area as well as with the groupings in component E and the vein portion at the right hand end of component A, that some of the elements of components overlap others in the depth or transverse relation, and that at least one of the components such as C is located in a depth strata different from others. Examples of overlapping depth-wise, portions of components A and E overlap component C. Also component C is located at a depth strata to the rear of component E and portions of component A. As previously stated, the model is further made distinctive by the application of contrasting colors to different parts according to their functions. This coloring is applied before the components are assembled in the complete model. Also, in actual practice we apply by printing or suitable means on a flat back surface, which is formed on the back of the top epidermis as at 66 and the back of the mesophyll area of the component A as at 67–68, descriptive material listing the various parts by their technical names. This listing includes numbers to conform with small numbers (not here shown) applied to the corresponding structural features portrayed by the model.

It will be apparent from the foregoing description and drawings that the model provides a distinctive form and grouping of chloroplast-containing cells to present to the immediate view of the student these cells substantially in their entirety and from all angles viewed from the front and the rear of the section. This form and grouping of the cells provides the relatively large air spaces which expose the exterior of the cells from front to back of the section as described above and shown in the drawings and thereby makes immediately visible to the student the large extent and the connectedness of the intercellular air spaces. This immediately presents to the student without guess or conjecture the relatively large and active aeration surfaces for the exchange of gases. This is a distinct advantage in teaching the function of photosynthesis in plant life.

It is believed that the foregoing conveys a clear understanding of our invention; and although a preferred embodiment of the invention has been illustrated and described, it will be uderstood that changes and variations may be made and that the invention may be applied in other embodiments, all without departing from the spirit and scope of the invention as defined in the appended claims.

We claim:
1. A model for the teaching of botany and the like, comprising a many times enlargement of a section through a leaf portraying the epidermis and mesophyll, said section covering an area extending from the front face of the section inwardly a substantial depth in a direction transverse to and away from said front face sufficient to embody the entire bodies of a multitude of chloroplast-containing cells, said cells being individually in full physical form and in normal relationship spaced one with respect to another both in the direction of said front section face and in said transverse direction thereby providing intercellular air spaces exposing to view the full exterior surfaces of the individual chloroplast-containing cells in said area except where the exterior surfaces of such cells are contiguous one with respect to another, said form and relationship providing connectedness of said intercellular air spaces and continuity of said air spaces in both said directions throughout said section area, whereby to present to the immediate view of the student the relatively large extent of said cell surfaces exposed to the air for aeration in the exchange of gases in teaching the function of photosynthesis in leaf plant life.

2. A model for the teaching of botany and the like, comprising a many times enlargement of a section through a leaf portraying the epidermis and mesophyll, said section covering an area extending from the front face of the section inwardly a substantial depth in a direction transverse to and away from said front face a distance sufficient to embody the entire bodies and groupings of a multitude of chloroplast-containing cells, said cells being spaced one with respect to another both in the direction of said front section face and in said transverse direction providing intercellular air spaces exposing to view the full exterior surfaces of the individual chloroplast-containing cells in said area except where the exterior surfaces of such cells are contiguous one with respect to another, certain of said air spaces being continuously open from said front face through to the rear face of the section and being open to view from said rear face, said cells providing connectedness of said intercellular air spaces and continuity of said air spaces in both said directions throughout said section area, whereby to present to the immediate view of the student the relatively large extent of said cell surfaces exposed to the air for aeration in the exchange of gases in teaching the function of photosynthesis in leaf plant life.

3. A model as set forth in claim 2, comprising a plurality of individually molded components, one component having the upper epidermis and a layer of palisade cells, another component having the lower epidermis and a grouping of chloroplast-containing cells, a plurality of individual components each having a plurality of the chloroplast-containing cells located to present to view their exterior surfaces, whereby to provide the connectedness and continuity of said intercellular air spaces, and means interlocking said components.

4. A model as set forth in claim 2, comprising a plurality of individually molded components, one component including the upper epidermis, another component including the lower epidermis, a plurality of individually molded components each having a plurality of said chloroplast-containing cells, and means interlocking said chloroplast-containing cell components in positions intermediate said epidermis components, each said chloroplast-containing cell component having its cells in a grouping different from that of the adjoining components, said interlocking means locating said cell components at different stratas in the depth of the section area.

5. A model as set forth in claim 2, comprising a plurality of individually molded components, one component including the upper epidermis and a grouping of palisade cells, another component including the lower epidermis and a grouping of chloroplast-containing cells and veins, a plurality of individually molded components each having a plurality of chloroplast-containing cells, each said chloroplast-containing cell component having its cell in a grouping different from that of the adjoining components, and means interlocking said chloroplast-containing cell components in positions intermediate said epidermis components with the chloroplast-chontaining cells.

6. A model as set forth in claim 2, in which said section is composed of a plurality of individually molded components, and means interlocking said components in a unitary model.

References Cited by the Examiner

Denoyer-Geppert Company, catalogue 635, copy in class 35 bookcase, copyright September 12, 1962, pages 54, 55, 56 only relied on.

JEROME SCHNALL, *Primary Examiner.*

H. S. SKOGQUIST, *Assistant Examiner.*